United States Patent [19]
Malzbender

[11] Patent Number: 6,166,740
[45] Date of Patent: Dec. 26, 2000

[54] METHOD AND SYSTEM FOR VIEWING THREE-DIMENSIONAL DATA FOR A TRACKED STRUCTURE

[75] Inventor: Thomas Malzbender, Mountain View, Calif.

[73] Assignee: Hewlett Packard Company, Palo Alto, Calif.

[21] Appl. No.: 08/228,050

[22] Filed: Apr. 15, 1994

[51] Int. Cl.[7] .................................................. G06T 15/30
[52] U.S. Cl. .......................................... 345/419; 382/128
[58] Field of Search ..................................... 395/118, 119, 395/120, 127; 364/413.13–413.23; 382/128; 345/418, 419, 420, 427

[56] References Cited

U.S. PATENT DOCUMENTS

| | | | |
|---|---|---|---|
| 4,742,557 | 5/1988 | Ma .............................................. | 382/51 |
| 4,875,165 | 10/1989 | Fencil et al. ........................ | 364/413.22 |
| 4,882,679 | 11/1989 | Tuy et al. ............................ | 364/413.22 |
| 4,922,915 | 5/1990 | Arnold et al. ........................... | 382/128 |
| 4,939,646 | 7/1990 | Essinger et al. ..................... | 382/128 X |
| 4,956,869 | 9/1990 | Miyatake et al. ........................... | 382/22 |
| 5,023,920 | 6/1991 | Breu .......................................... | 382/55 |
| 5,121,191 | 6/1992 | Cassereau et al. ........................ | 358/13 |
| 5,237,646 | 8/1993 | Bunce ..................................... | 395/117 |
| 5,271,064 | 12/1993 | Dhawan et al. ........................... | 382/54 |
| 5,283,837 | 2/1994 | Wood .......................................... | 382/6 |
| 5,297,043 | 3/1994 | Tuy et al. ............................. | 395/127 X |
| 5,369,678 | 11/1994 | Chiu .......................................... | 378/62 |
| 5,396,890 | 3/1995 | Weng ................................... | 382/128 X |

OTHER PUBLICATIONS

K.R. Hoffman, Automated Three–Dimensional Vascular Reproduction from Stereoangiograms, IEEE Engineering in Medicine & Biology Society 10th Annual International Conference, 1988.

K. Kitamura, Estimating the 3–D Skeletons and Transverse Areas of Coronary Arteries from Biplane Angiograms, IEEE Transactions on Medical Imaging, vol. 7, No. 3, Sep. 1988.

N. Alperin, Automated Analysis of Coronary Lesions from Cineangiograms Using Vessel Tracking and Iterative Deconvolution Techniques, Computers in Cardiology, 1989.

R.H. Selzer, Computer–Generated 3D Ultrasound Images of the Carotid Artery, Computers in Cardiology, 1988.

Ying Sun, Automated Identification of Vessel Contours in Coronary Arteriograms by an Adaptive Tracking Algorithm, IEEE Transactionss on Medical Imaging, vol. 1, No. 1, Mar. 1989.

Chaudhuri et al., "Detection of Blood Vessels in Retinal Images Using Two–Dimensional Matched Filters", IEEE Transactions on Medical Imaging, vol. 8, No. 3, Sep. 1989, pp. 263–269.

Hoffmann et al., "Automated Tracking and Computer Reproduction of Vessels in DSA Images", Investigative Radiology, vol. 25, Oct. 1990, pp. 1069–1075.

*Primary Examiner*—Mark K. Zimmerman

[57] ABSTRACT

A method and system for viewing three-dimensional data which corresponds to a structure that has been tracked throughout the three-dimensional data is disclosed. Typically, structures which require tracking so that they can be followed throughout three-dimensional data are non-planar and, therefore, very difficult to view. Initially, tracking data is obtained by tracking a structure through the three-dimensional data. After the structure has been tracked through the three-dimensional data, the structure is displayed on a monitor or display device such that the portion of the three-dimensional data which is pertinent to the tracked structure is distinguishable from other data. As a result, a user can readily and easily view the data associated with the tracked structure. As an example, when the tracked structure is an artery, the image of the tracked structure displayed on the monitor or display device is not simply a planar slice of the three-dimensional data, instead it is planar perpendicular to the tracked structure and along a spline curve which follows the tracked data points through the three-dimensional data. Consequentially, for this example, the geometry of the displayed image is a ruled spline cutting surface formed from the three-dimensional data corresponding to the tracked structure.

9 Claims, 6 Drawing Sheets

METHOD AND SYSTEM FOR VIEWING THREE-DIMENSIONAL DATA FOR A TRACKED STRUCTURE

BACKGROUND OF THE INVENTION

1. Field of the Invention

The present invention relates to techniques for viewing three-dimensional data and, more particularly, to a method and apparatus for viewing data for a structure which has been tracked through three-dimensional data.

2. Description of the Related Art

In using three-dimensional data, images of many structures do not remain in a given two-dimensional plane. As a result, when viewing three-dimensional data on a conventional computer screen, it is difficult to identify and trace these non-planar structures within the three-dimensional data.

Tracking approaches are known, but these known tracking approaches operate only on two-dimensional data. See, Hoffmann et al., *Automated Tracking and Computer Reproduction of Vessels in DSA Images, Investigative Radiology*, vol. 25, pp. 1069–75, October, 1990; and Chaudhuri et al., *Detection of Blood Vessels in Retinal Images Using Two-Dimensional Matched Filters*, IEEE Transactions on Medical Imaging, Vol. 8, No. 3, pp. 263–269, September 1989. Even assuming the known tracking approaches track the structure correctly in two-dimensional data, the images produced from two-dimensional data are inferior to those images that would be produced by three-dimensional data.

In any case, once a structure is tracked, it must be displayed for a user. Conventionally, a tracked structure could at best be merely hightlighted in the original dataset. In order to visualize the structure, the user would have to manually search through the three-dimensional data until the structure was found and then, in order to follow the structure throughout the data, the user would have to make manual adjustments to change to different planar data slices. The conventional display methods make it difficult for a user to extract or interpret the data concerning the tracked structure. The conventional methods also make no effort to minimize the amount of data displayed which does not pertain to the tracked structure.

Three-dimensional data offers significantly more information to a user than does two-dimensional data. This additional dimension makes the images eventually displayed more meaningful to the user. One type of three-dimensional data is magnetic resonance imaging (MRI) data which is used by doctors for diagnosis of patients. MRI data is becoming useful in the diagnosis and treatment of blockages existing in a patient's coronary arteries.

Consider for example the problem of tracking or viewing arteries. Currently, a medical doctor's diagnosis is made by viewing only a single (two-dimensional) slice of MRI data at a time. Although the particular slice of data is accurate, it is difficult for the doctor to accurately evaluate the health of the coronary arteries because only discrete slices of data can be viewed one at a time. Although a doctor can switch back and forth between slices in an attempt to follow an artery, such data is confusing and difficult to interpret because there is no information as to what happens to the artery between such data slices. Also, due to the interplay of various images, locating the artery being evaluated in each slice of data is difficult. Hence, the doctor's diagnosis is hindered because three-dimensional tracking is unavailable to assist the doctor by identifying and/or extracting the relevant data concerning the structure being tracked.

Thus, since known methods for displaying tracked structures are inadequate, there is a need for a technique to visualize structures, such as arteries, which have been tracked through three-dimensional data so that the artery or other tracked structure can be easily and readily viewed.

SUMMARY OF THE INVENTION

Broadly speaking, the invention relates to a technique for displaying a non-planar structure contained in and tracked through three-dimensional data such that the displayed data follows the non-planar nature of the tracked structure. The invention can, for example, be implemented as a method or as a system.

As a system, the invention includes a device for receiving tracking data points (within the three-dimensional data) for the structure to be displayed, a controller for sampling the three-dimensional data in a planar direction between the tracking data points for the structure and along a spline curve formed by the tracking data points, and a display device for displaying the sampled data for the structure.

As a method, the invention receives tracking data (e.g., medial axis points) in the three-dimensional data for the structure. Next, the method samples, in a planar direction, the three-dimensional data along a spline curve formed by the tracking data. Thereafter, the sampled data is displayed on a monitor or other display device.

In the case where the structure tracked is an artery, the tracking data is preferably medial axis points of the artery, and the three-dimensional data is preferably MRI data. The resulting image of the artery is a length-wise cross-section which has a ribbon-like appearance.

The invention offers numerous advantages as compared with the prior art. Namely, the invention provides a visualization technique that is suitable for visualizing structures which have been tracked in three-dimensional data. The visualization technique enables tracked structures to be easily and readily viewed on a computer display or monitor.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–7. However, those skilled in the art will readily appreciate that the detailed description given herein with respect to these figures is for explanatory purposes as the invention extends beyond these limited embodiments.

Once a structure is tracked throughout three-dimensional data, the tracked structure must be displayed so that the structure can be easily viewed by a user. Typically, structures which require tracking so that they can be followed throughout three-dimensional data are non-planar and, therefore, very difficult to view. Conventional approaches to tracking and displaying, which simply display a planar slice of the data, are inadequate. This invention provides a novel way to display the tracked structure so that the data associated with the structure can be easily and readily observed.

Typically, tracking techniques produce data points (tracking data) which are associated with the structure being tracked. The tracking data may, for example, be boundary points or medial axis points of the structure as it progresses through the three-dimensional data. The data points are normally, though not necessarily, stored in a sequential list. The preferred tracking technique is described in detail below.

The invention provides a novel method and system for viewing three-dimensional data which corresponds to a structure that has been tracked. By making use of such tracking data, the invention is able to display on a computer display or monitor only that portion of the three-dimensional data that is pertinent to the tracked structure. As a result, a user can readily and easily view the tracked structure.

The image of the tracked structure displayed on the computer display or monitor is not simply a planar slice of the three-dimensional data, instead it is planar perpendicular to the tracked structure and along a spline curve which follows the tracked data points (e.g., medial axis points) through the three-dimensional data. Consequentially, the geometry of the displayed image is a ruled spline cutting surface formed from the three-dimensional data corresponding to the tracked structure.

Figure 1:
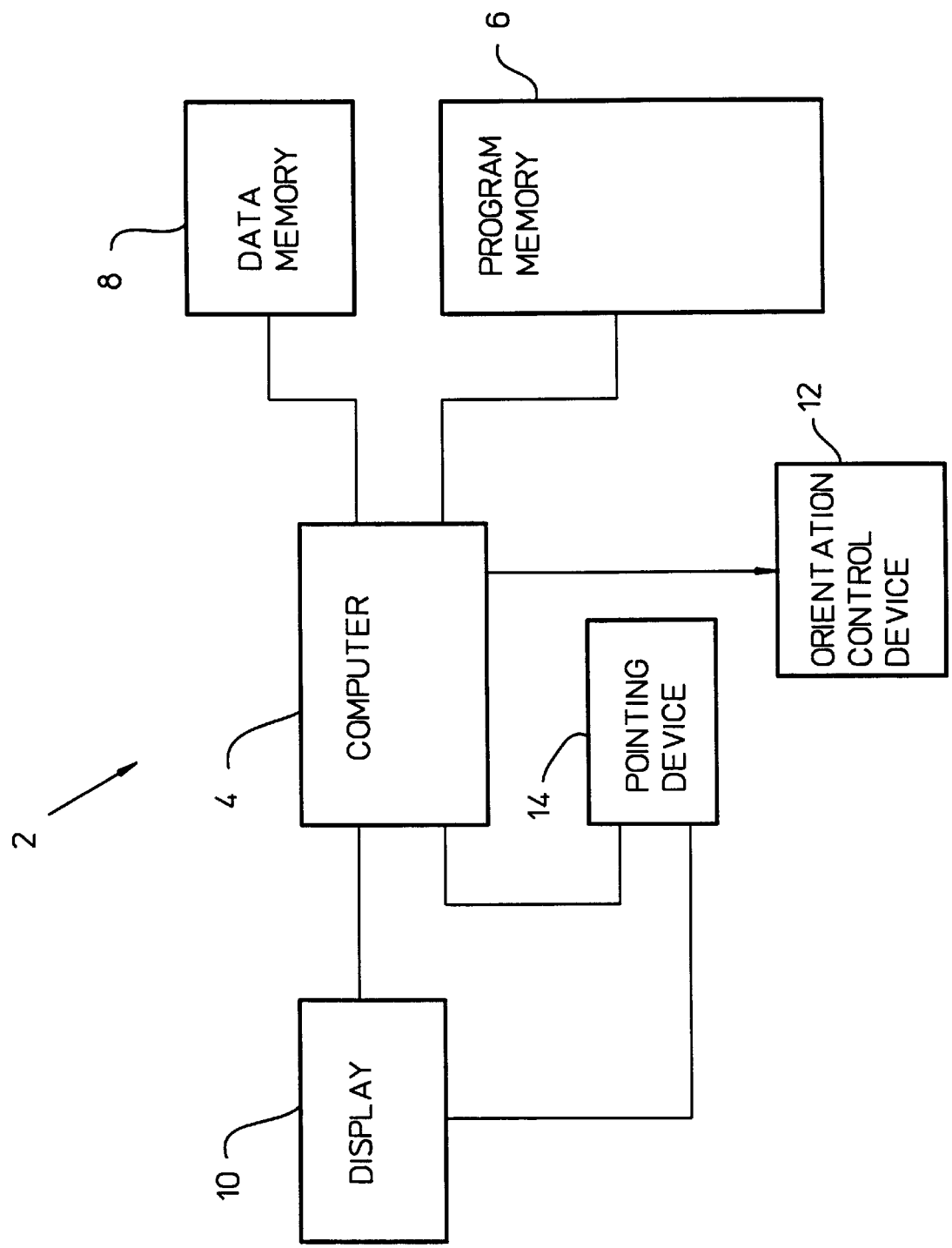
FIG. 1 is a block diagram of a tracking system according to the invention.

FIG. 1 is a block diagram of a system for displaying three-dimensional data according to the invention. The system 2 includes a computer 4 which controls operation of the system 2. The computer 4 can be a computer, a microprocessor or other circuitry. The computer 4 is connected to a program memory 6 which stores a visualization program to be executed by the computer 4. The operation of the visualization program is described in detail below with respect to FIGS. 2 and 3. The computer 4 is also connected to a data memory 8. The data memory 8 stores the three-dimensional data (the dataset) as well as sampled data produced by the visualization program. The computer 4 is further connected to a display 10 and an orientation control device 12. The display 10 displays the data corresponding to the tracked structure which has been identified by the visualization program. The orientation control device 12 can be used to select an orientation from which to view the data associated with the structure.

Figure 2:
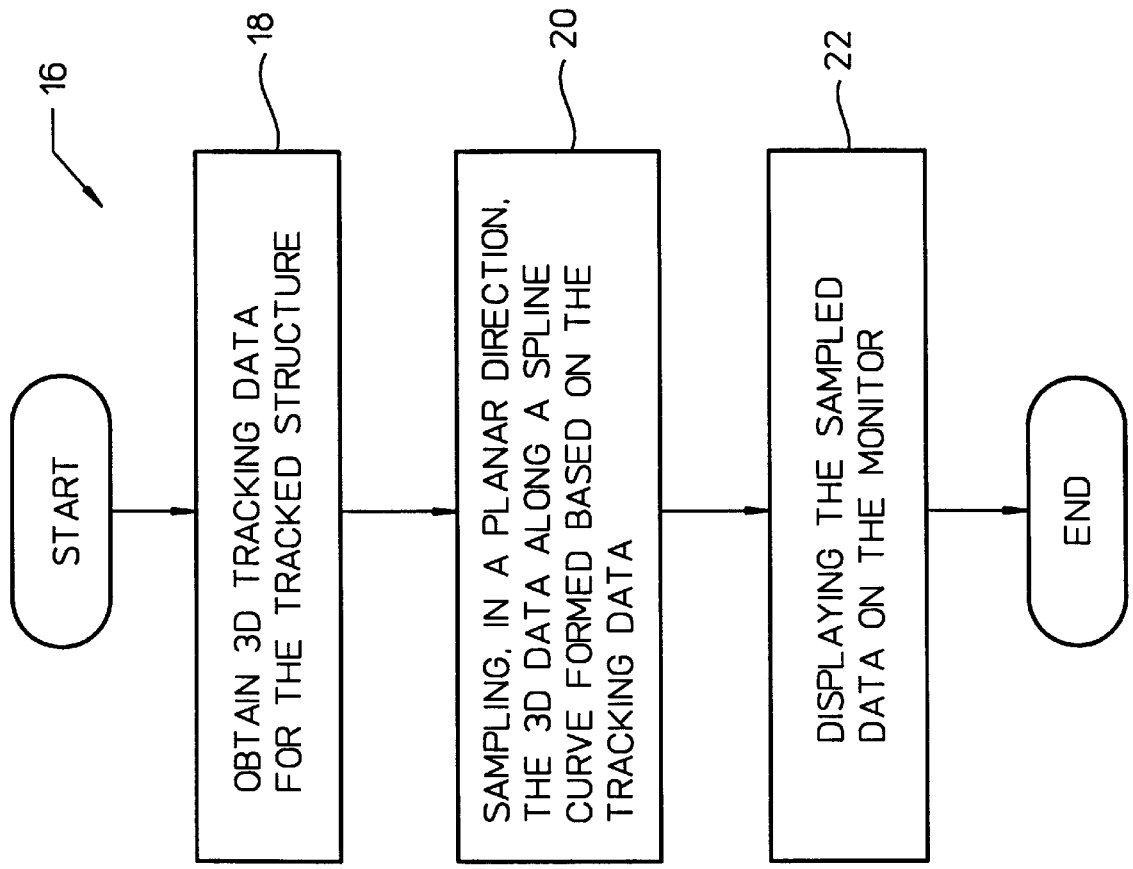
FIG. 2 is a flow chart of a basic embodiment of a method according the invention.

FIG. 2 illustrates a basic embodiment of the visualization method according to the invention. The visualization method 16 is carried out when the visualization program is executed. The method 16 initially obtains 18 tracking data for the tracked structure. The three-dimensional tracking data is produced by a tracking program which could also reside in the program memory 6 of the system 2. The operation of a preferred tracking program is described below with reference to FIG. 6.

Next, the three-dimensional data is sampled 20 in a planar direction and along a spline curve formed based on the tracking data. Although the planar direction in which the three-dimensional data is preferably sampled remains constant, the sampling position will follow the tracked structure in the three-dimensional data because the sampling 20 is performed along the spline curve corresponding thereto. As a result, the sampling 20 (although uniformly in the planar direction) will sample the data corresponding to the non-planar structure in the plane in which the structure is in at each sample point.

Finally, the sampled data is then displayed 22 on the computer display or monitor. The displaying of the sampled data illustrates the data along the spline curve which is associated with the tracked structure. Specifically, the sampled data produced by the visualization program is displayed on the computer display or monitor as a ruled splined cutting surface. As a result, the user can view the cross-section of the structure in the planar direction in a single view because the data displayed follows the structure.

Figure 3:
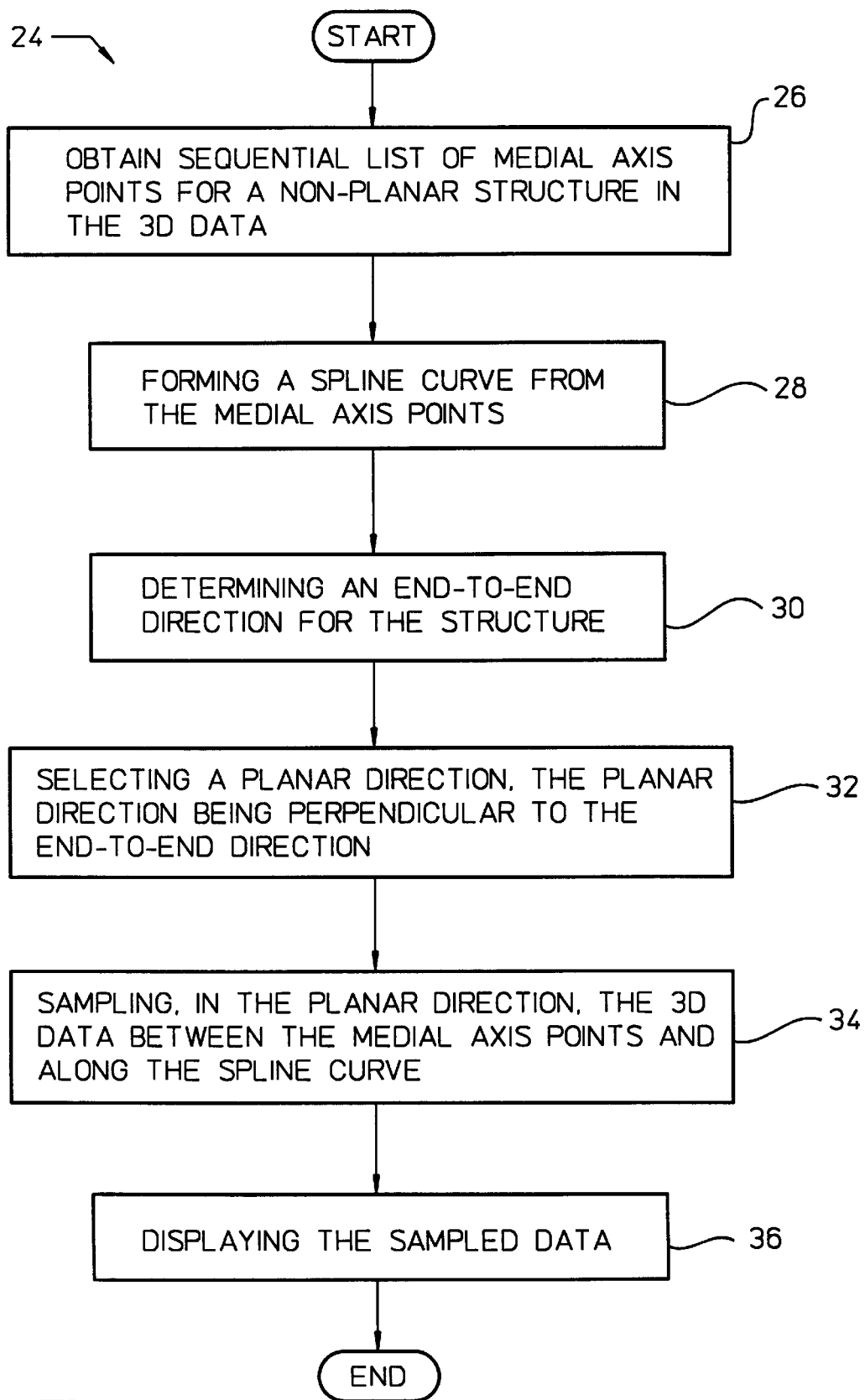
FIG. 3 is a flow chart of a first embodiment of a method according to the invention.

FIG. 3 is a flow chart of a first embodiment of the visualization method according to the invention. In this embodiment, the method 24 begins by obtaining 26 a sequential list of medial axis points for a non-planar structure within the three-dimensional data. Here, although medial axis points are used, other tracking data could also be used. However, for tubular structures such as arteries, a sequential list of medial axis points is preferred.

Next, a spline curve is formed 28 is formed from the medial axis points. When the medial axis points are arranged in a sequential list, they can be linked together to form the spline curve. A second-order spline curve would require only linear interpolation between the medial axis points. For higher order spline curves more sophisticated interpolation would be used, with the result being a smoother spline curve.

An end-to-end direction for the structure is also determined 30. The end-to-end direction can be determined in a number of ways. One way is to set the end-to-end direction to the direction of a line which would connect the first and last medial axis point in the sequential list. The end-to-end direction merely provides the general direction for the structure in the three-dimensional data. Thereafter, a planar direction, which is perpendicular to the end-to-end direction, can be selected 32.

The sampling 34 of the three-dimensional data then occurs. The sampling 34 is performed in the planar direction and between the medial axis points and along the spline curve. By sampling 34 in the planar direction, the sampled data should contain the length-wise cross-section of the data for the structure. Finally, the sampled data is displayed 36.

Although the use of an end-to-end direction simplifies the sampling and displaying of the data corresponding to the structure, the use of an end-to-end direction can be eliminated and the sampling of the data could always be performed in the direction perpendicular to the spline curved formed from the medial axis points. In either case, the sampling is along the spline curve.

The visualization method may also include a step in which a viewing direction is changed. The viewing direction is a point (relative to the tracked structure) from which the user views the sampled data. The viewing direction can be altered by the user via the orientation control device 12. The displayed images are correspondingly changed in accordance with the new viewing direction using known computer graphic techniques (e.g., transformation martix).

In a preferred implementation of the invention, the structure being tracked is an artery and the three-dimensional data is discrete MRI data. The preferred use of the invention is then to view arteries which have been tracked throughout MRI data. In this case, it is preferable that the sampling 34 of the three-dimensional data be performed a predetermined distance above and below the medial access points. Because the data corresponding to the artery is displayed in a ruled spline surface the user can visualize the entire cross-section of the artery without having to manually adjust the data slice being viewed.

Figure 7:
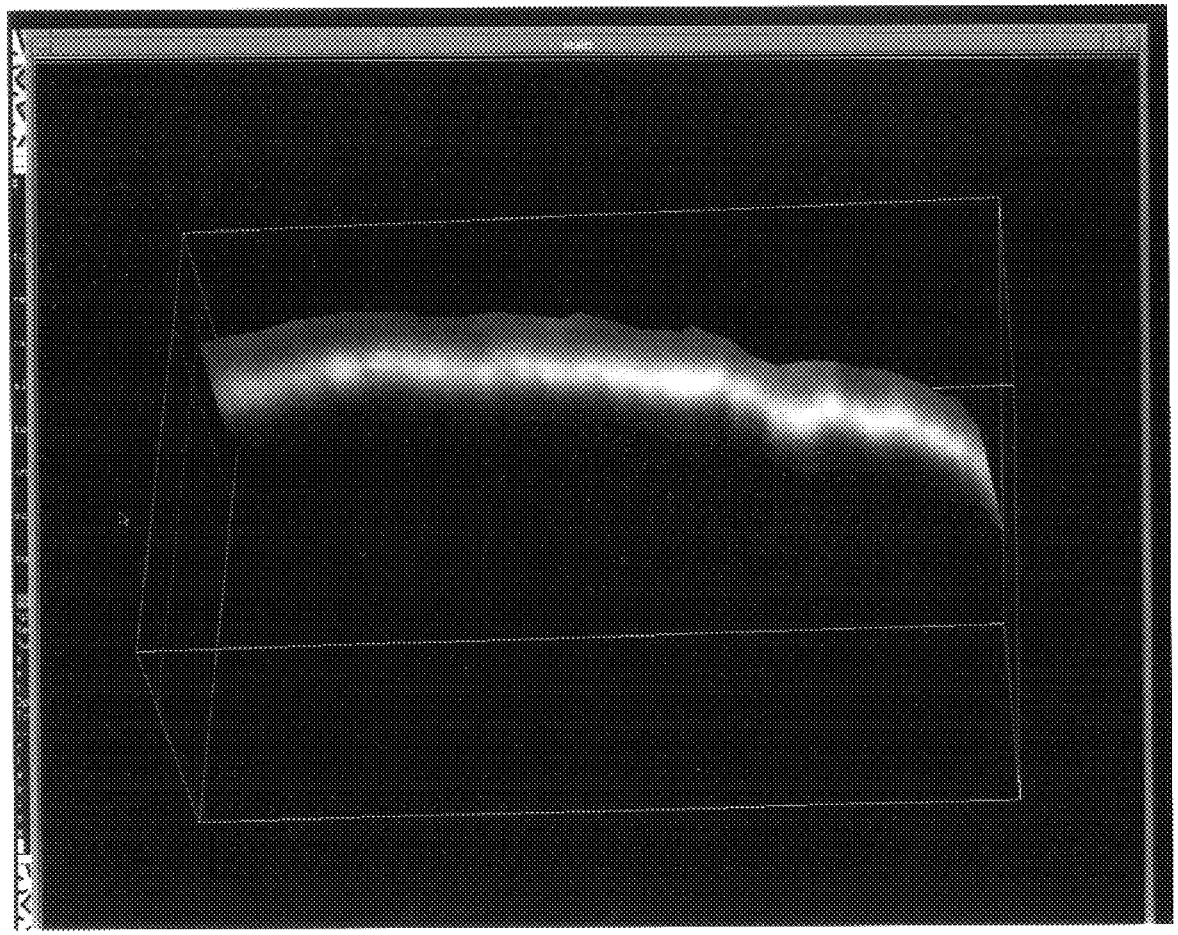
FIG. 7 illustrates an example of a ruled spline surface (slicing ribbon) produced by the invention for a coronary artery within MRI data.

FIG. 7 illustrates an example of such a ruled spline surface produced by the invention for a coronary artery in MRI data. The resulting image of the artery is a length-wise cross-section which has a ribbon-like appearance.

Displaying of the artery requires interpolation of the three-dimensional data because the data is typically discrete points which are stored in an array or matrix. The interpolation is trilinearly performed on the discrete data to produce data suitable for conventional graphics hardware. The graphic hardware will perform Gouraud shading so that the displayed images will appear as though the data were continuous.

In the preferred embodiment, the tracking data is a sequential list of medial access points for the structure in the three-dimensional data. Typically, this sequential list of medial access points would have been produced by a tracking technique. A preferred tracking technique is described below with reference to FIGS. 4–6.

The tracking technique which tracks a structure in three-dimensional data. The tracking technique uses a geometric shape to model the structure to be tracked. Tracking is achieved by adapting the geometric shape at a given three-dimensional point within the structure being tracked until the geometric shape best fits the structure being tracked. Using this "best fit" information a subsequent point within the structure being tracked can be identified. The geometric shape is then adapted at or near the subsequent point until a best fit is identified. Note, the geometric shape used for tracking does not necessarily have the same shape as that of the structure being tracked.

The three-dimensional data can be of a variety of types. For example, the data type may be MRI data. It should be noted that typically MRI data is discrete data which forms a matrix-like volume in three-dimensions. The invention, however, preferably and more precisely operates on continuous data by interpolating from the matrix points of the discrete MRI data.

The "best fit" information is obtained from a digital filter and a transformation matrix. The digital filter is configured in the geometric shape which models the structure being tracked. Transformation matrixes are a conventional computer graphics technique. See, Foley and Van Dam, *Fundamentals of Interactive Computer Graphics*, Section 7.5, 1982.

The "best fit" information is obtained for a given three-dimensional point within the structure being tracked. The "best fit" is determined using filter responses which are an indication of whether the digital filter (as transformed by the transformation matrix) is properly aligned with the structure being tracked. Various responses are obtained for different alignments. Based on the responses, the invention determines the orientation of the structure at the given three-dimensional point within the three-dimensional data. In effect, the orientation chosen is that which corresponds to the greatest response (i.e., "best-fit" information). A next point within the structure is thereafter determined using the previous point as well as the orientation of the structure at the previous point. After obtaining orientations of the structure at various adjacent but separated points in the three-dimensional data, the points can be visually linked together or otherwise distinguishably displayed so that the user can easily follow the structure through the three-dimensional data.

Figure 4:
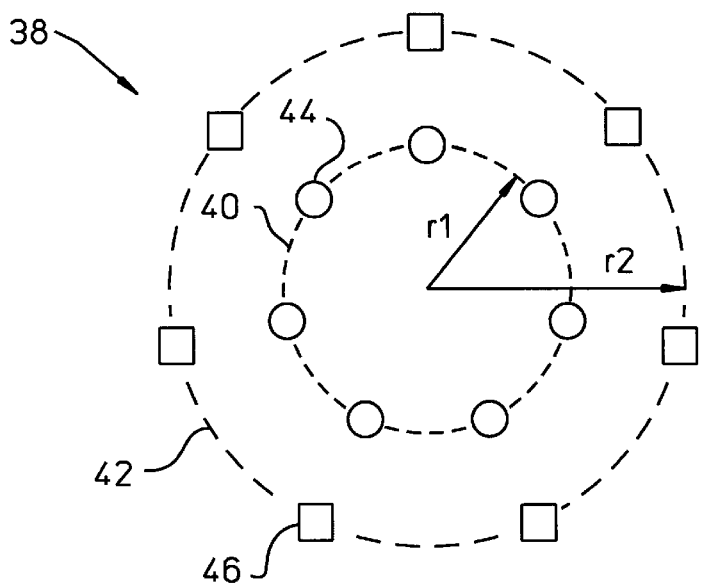
FIG. 4 is a schematic diagram of a first embodiment of a spatial filter.

FIG. 4 is a schematic diagram of a spatial filter 38. The spatial filter 38 is a two or three dimensional digital filter. The spatial filter 38 includes a first ring 40 of radius r1 and a second ring 42 of radius r2. The first ring 40 is illustrated as having seven filter coefficients 44 (each coefficient being represented by a small circle), and the second ring 42 is illustrated as having seven filter coefficients 46 (each coefficient being represented by a small square). The first ring 40 and the second ring 42 are coplanar. Although FIG. 4 illustrates the filter coefficients 44, 46 as having a small area or volume, the filter coefficients 44, 46 actually operate at points, which are referred to as sample points. Moreover, the number of filter coefficients 44, 46 can vary depending on the accuracy desired and the processing time available.

Although the rings 40 and 42 of the spatial filter 38 illustrated in FIG. 4 are circular rings, other shapes may be used. Ultimately, the geometric shape in which the coefficients are arranged should model the structure being tracked.

Figure 5A:
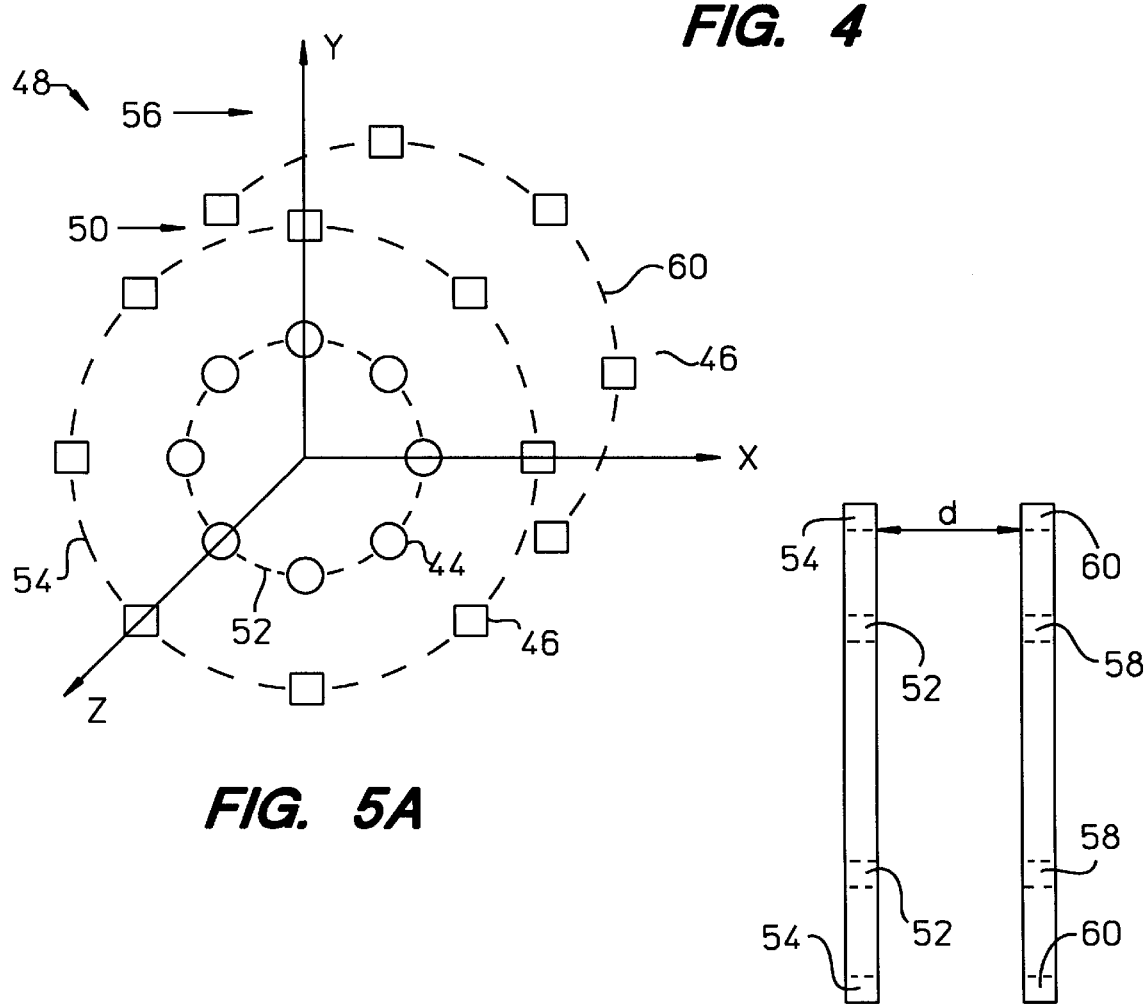
FIG. 5A is a perspective view of a second embodiment of a spatial filter.

The following discussion will concentrate on the spatial filter illustrated in FIGS. 4 and 5A because an important application or use of the invention is to track arteries which have a tubular structure. In which case, the spatial filter preferably has a geometric shape which is circular or tubular so as to model arteries.

Figure 5B:
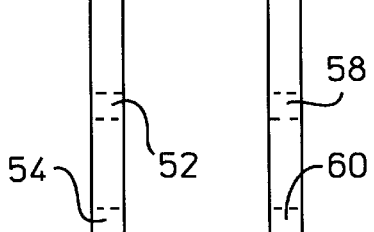
FIG. 5B is a side view of the spatial filter illustrated in FIG. 5A.

FIGS. 5A and 5B are views of a spatial filter 48 which is preferable for tracking arteries. The spatial filter 48 is preferable for searching for arteries because the filter itself has a tubular structure thus making it more computationally efficient and accurate in tracking arteries. The spatial filter 48 includes a first tier 50 which includes an inner ring 52 and an outer ring 54. These rings 52, 54 are constructed as are the rings 40, 42 shown in FIG. 4. That is, each ring 52, 54 consists of filter coefficients 44, 46 arranged in a circular ring. The spatial filter 48 also includes a second tier 56 which includes similar rings 58, 60. The first tier 50 is separated from the second tier 56 by a distance d. The radii r are preferably 0<r<1 with the inner ring having a radius r and the outer ring having a radius of 1/r. The actual radius of the rings of the filter are scaled to the desired size in accordance with this relationship.

Preferably, when tracking arteries the filter coefficients 44, 46 have a value of one and have opposite signs. For example, with a bright blood MRI data, the filter coefficients 44 would be +1 and the filter coefficients 46 would be −1. The response R of the spatial filter 48 at the three-dimensional point (x,y,z) as oriented as shown in FIG. 5A is computed by the following equation.

$$R(x, y, z) = \sum_{i}^{M} \sum_{j}^{2} [\delta(x - \gamma\cos(2\pi i/M))\delta(y - \gamma\sin(2\pi i/M))\delta(z - j + 1/2) - \delta(x - \gamma^{-1}\cos(2\pi i/M))\delta(y - \gamma^{-1}\sin(2\pi i/M))\delta(z - j + 1/2)]$$

where δ is a delta function, which takes on a value of 1.0 if its argument is zero, otherwise it takes on a value of zero; γ is the radius of the inner ring; $\gamma^{-1}$ is the radius of the outer ring; and M is the number of coefficients in a tier. The equation for the case where there are two tiers.

Figure 6:
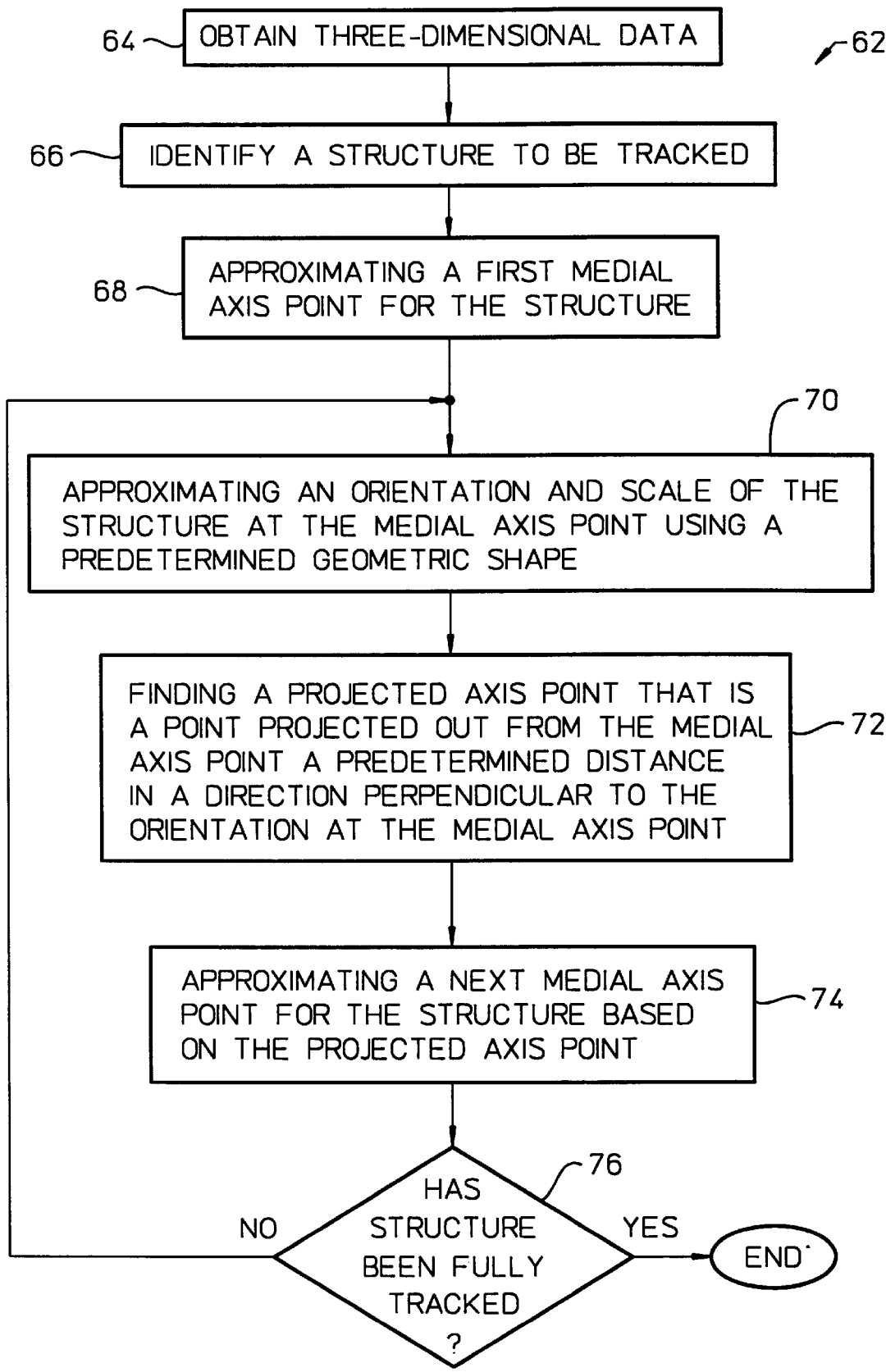
FIG. 6 is a flow chart of a basic embodiment of a tracking method.

FIG. 6 is flow chart of a basic embodiment of a tracking method according to the invention. The tracking method can be carried out by a tracking program stored in the program memory 6 and executed by the computer 4. The tracking method 62 illustrated in FIG. 6 includes a number of operations.

Initially, a dataset of three-dimensional data is obtained 64. The dataset can be held in a data memory 8. Next, a structure to be tracked is identified 66. For example, in accordance with FIG. 1, a user would use the pointing device 14 to indicate on the display 34 a particular structure within the three-dimensional data which the user desires to track through the dataset. As an example, the structure identified 66 might be a coronary artery.

Once the structure is identified 66, a first medial axis point for the structure is approximated 68. For an artery, the first medial axis point could be selected by a user via the pointing device 14 to roughly approximate 68 the center of the artery. In this case, the identifying 66 and the approximating 68 could be performed by a single user action. Alternatively, the technique could be enhanced by having the tracking program approximate 68 the first medial axis point for the structure.

Once the first medial axis point has been approximated 68, an orientation and scale of the structure at the medial axis point can be approximated 70 using a predetermined geometric shape. This approximation 70 is carried out by the computer 4 as it executes the tracking program. The tracking program includes executable code to implement the spatial filter and a transformation matrix.

The spatial filtering performed by the tracking program performs the spatial (digital) filtering using a predetermined geometric shape. For example, for tracking arteries, the predetermined geometric shape would be circular or tubular (see spatial filter 38, 48).

The transformation matrix implemented by the tracking program varies three-degrees of freedom of the predetermined geometric shape at a three-dimensional location within the structure so that a maximized response can be identified. In effect, the transformation matrix operates to rotate the spatial filter about the three-dimensional location. At each of many discrete different orientations, the filter response is measured. Once filter responses for a predetermined number of orientations have been obtained, the tracking program selects the orientation of the structure being tracked to be the orientation of the spatial filter yielding the maximized response.

The transformation operates to approximate three-degrees of freedom of the spatial filter at a three-dimensional location. In total, the tracking program controls six degrees of freedom. The three-dimensional location within the structure represents three dimensions (e.g., the origin of the x',y',z' coordinate system) and the other three degrees of freedom (determined by the transformation means) are the two angles in spherical coordinates, theta ($\theta$) and phi ($\phi$), and a scale ($\kappa$).

The spherical coordinates specify the orientation of the structure as estimated by the predetermined geometric shape. In a circular or tubular geometric shape, the scale corresponds to radius. Thus, once the maximized response is identified, the tracking program determines or approximates the radius and orientation of the structure at the first medial axis point. Of course, if the scale is uniform in the structure being tracked, the scale need not be varied in searching for the maximized response.

Given that the spatial filter must be placed at the three-dimensional location, the spatial filter must be translated from the base coordinate system (x,y,z) to the coordinate system having as its origin the three-dimensional location (x',y',z'). The tracking program implements this translation operation with a translation matrix. However, it is preferred that the transformation matrix incorporate both the translation and the rotation (orientation) operations. The preferred combined matrix is then as follows.

$$\begin{bmatrix} \kappa\cos(\phi)\cos(\theta) & \kappa\cos(\phi)\sin(\theta) & -\kappa\sin(\phi) & 0 \\ \kappa\sin(\theta) & \kappa\sin(\phi) & 0 & 0 \\ \kappa\sin(\phi)\cos(\theta) & \kappa\sin(\phi)\sin(\theta) & \kappa\cos(\phi) & 0 \\ x' & y' & z' & 1 \end{bmatrix}$$

As discussed above, the three-dimensional data can be MRI data. Typical MRI data has twelve (12) bit values for its intensity distributions. Processing can be simplified by normalizing the MRI data to smaller data values. For example, by normalizing the MRI data to values between 0 and 255, only eight bit values would be necessary; however, some loss of resolution would result. Further, when the dataset is a bright blood MRI dataset and the filter coefficients 8, 10 are +1 and −1, respectively, then the response obtained (from spatial filter and transformation matrix) is preferably computed as follows. The response is the sum of the products of the filter coefficients 44, 46 and the intensity values of the data at the sample points (i.e., the three-dimensional locations of the filter coefficients). As mentioned, the intensity values at the sample points represent those of continuous data because interpolation (from nearest matrix points) is used to accurately estimate the actual value. As a result, when the scale and orientation of the spatial filter 38, 48 are properly aligned with the structure being tracked, the response will be maximized because the additive value from the inner ring 40, 52 and 58 will be large and the subtractive value of the outer ring will be small.

In general, the tracking program operates to check numerous radius sizes and numerous orientations and then selects the radius and corresponding orientation which yields the maximized filter response. When the response is maximized, the scale represents the radius of the wall because the actual artery wall would be between the inner ring and the outer ring.

In any case, returning to FIG. 6, once the orientation and scale of the structure at the medial axis point are approximated 70, it is necessary to track the structure to a subsequent position. Specifically, a next medial axis point for the structure is approximated 72 based on the previous medial axis point and the orientation.

The next medial axis point can be determined or approximated as follows. First, by projecting out from the medial axis point a predetermined distance in a direction along the medial axis, a projected axis point is found 72. One way this can be achieved is by projecting the predetermined distance out from the medial axis point in the direction which is perpendicular to the plane in which the orientation resides. Well known vector approaches can be used to make the projection. Second, the next medial axis point for the structure being tracked can then be approximated 74 based on the projected axis point. For example, using the projected axis point as a rough approximation of the position of the position of the next medial axis point, a constrained search can be performed in the near vicinity of the projected axis point. The point which yields the maximized filter response is chosen as the next medial axis point. This searching would involve checking the orientation and radius of various points in the near vicinity of the projected axis point. Using this approach, the maximized filter response then yields not only the next medial axis point, but also the scale and orientation for the next medial axis point, thereby combining the operations of block 70 with those of block 74.

Blocks 70 through 74 thereafter repeat for each subsequent axis point for the structure until a decision block 76 determines that the structure has been fully tracked. Once fully tracked, the tracking of the structure is completed and the information produced by the tracking may be used in any way desired. Typically, the tracked structure will be displayed in the display 10 of the tracking apparatus 2 to facilitate doctor's diagnosis.

Additional details on the preferred tracking technique are described in U.S. application Ser. No. 08/228,042, entitled "Method and Apparatus for Tracking Structures in Three-Dimensional Data", filed concurrently herewith, and hereby incorporated by reference.

The many features and advantages of the invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of displaying a structure that represents three-spatial dimensions using a computer, a data base that includes an image data set in which the structure is defined, and a display monitor, comprising:

analyzing the image data set with the computer to determine a set of medial axis points of the structure which extends through the three-spatial dimensions;

extruding a display data set using the computer, the display set being a subset of the image data set, by
defining an extrusion vector in the three spatial dimensions,
defining the display data set data to include data from the image data set that lies within a set of vectors that are both (a) parallel to the extrusion vector, and (b) that also pass through one of the medial axis points;

wherein both of the image data set and the display data set include data representing three-spatial dimensions; and generating a display image from the display data set.

2. A method according to claim 1, wherein defining an extrusion vector in the three spatial dimensions includes:

selecting a first point and a second point from the image data set;

selecting an intermediate vector that extends from the first point toward the second point; and constraining the extrusion vector to lie within a plane that is normal to the intermediate vector.

3. A method according to claim 2, wherein:

selecting the first point and the second point includes
selecting one of the medial axis points as the first point, and
selecting a different one of the medial axis points as the second point; and constraining the extrusion vector includes
constraining the extrusion vector to lie within a plane that is normal to the vector extending from the first point toward the second point.

4. A method according to claim 1, wherein analyzing the image data set includes: analyzing the image data set using the computer to select a first group of medial axis points and thereby track the structure, each point in the first group separated by a predetermined sampling interval from other points in the first group.

5. A method according to claim 4, wherein analyzing the image data set includes:

defining a second group of medial axis point to be all points lying on a direct line between each adjacent pair of points in the first group of medial axis points.

6. A method according to claim 1, wherein defining the display data set further includes: defining the display data set to include all data points found on any vector that is parallel to the extrusion vector and also passes through a medial axis point.

7. A method according to claim 1, wherein generating a display image includes:

using the computer to define coordinates of a viewpoint in the three-spatial dimensions;

using the computer to select an image display that is chosen from the perspective of the viewpoint.

8. A method according to claim 1, the method further using a user interface device that is operatively coupled to the computer, wherein defining the extrusion vector includes:

defining an intermediate vector that is a direct line between two selective medial axis points; and using the user interface device to select the extrusion vector from the set of vectors that lie within a plane that is perpendicular to the intermediate vector.

9. An apparatus for displaying a structure that represents three-spatial dimensions, the structure being defined in an image data set, comprising:

a computer driven to analyze the image data set and determine therefrom a set of medial axis points of the structure which extends through the three-spatial dimensions;

means for extruding a display data set which is a subset of the image data set, by
defining an extrusion vector in the three spatial dimensions,
defining the display data set data to include data from the image data set that lies within a set of vectors that are both (a) parallel to the extrusion vector, and (b) that also pass through one of the medial axis points;

wherein both of the image data set and the display data set include data representing three-spatial dimensions; and a display that is operatively coupled to the computer to display a display image from the display data set.

* * * * *